Patented Nov. 5, 1935

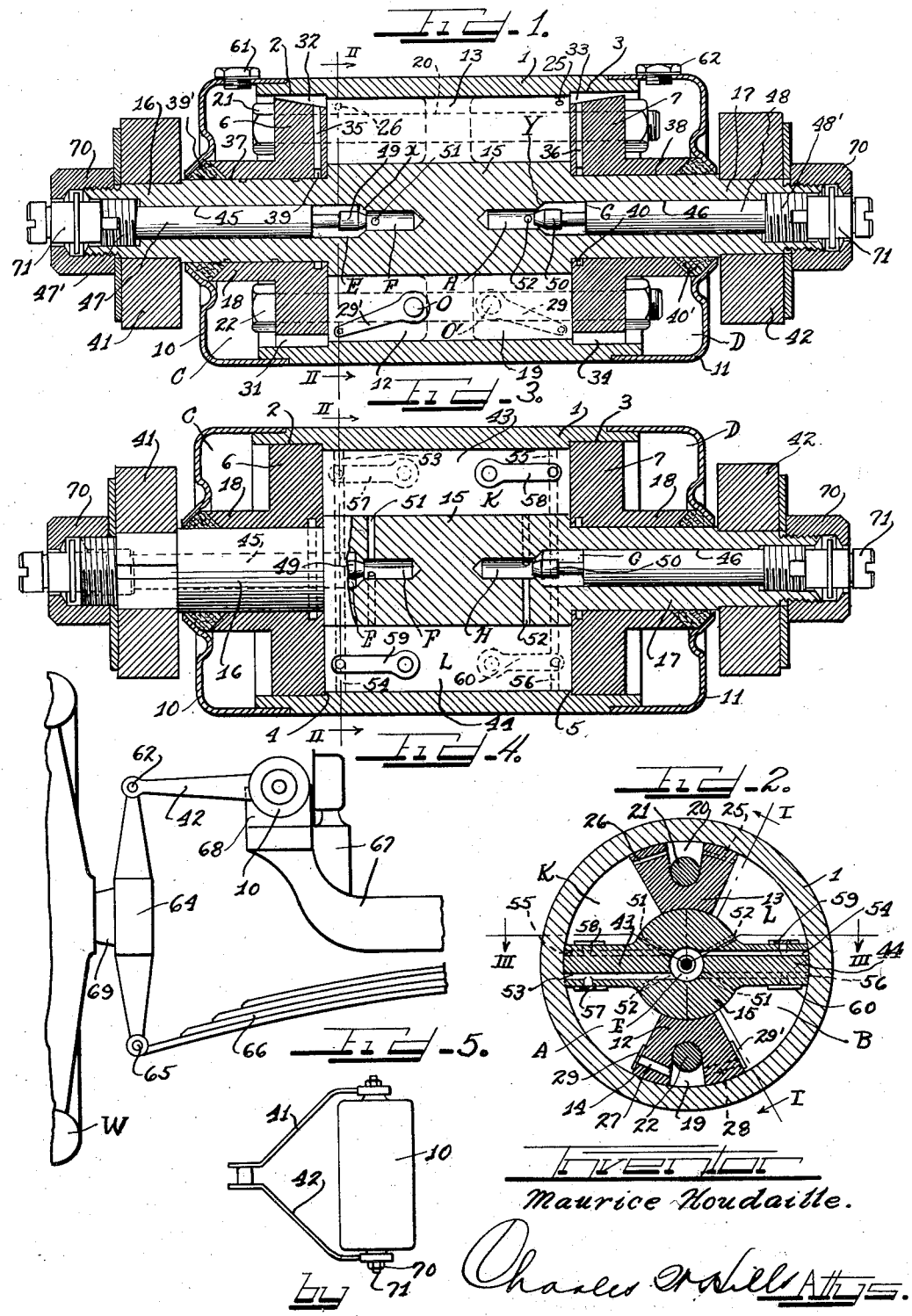

2,019,974

UNITED STATES PATENT OFFICE 2,019,974

HYDRAULIC SHOCK ABSORBER

Maurice Houdaille, Paris, France, assignor to Houde Engineering Corporation, Buffalo, N. Y., a corporation of New York Application July 9, 1934, Serial No. 734,327, In France October 2, 1933

5 Claims. (Cl. 188—89)

My invention relates to hydraulic shock absorbers which are particularly adaptable for use on automotive vehicles for damping and absorbing road shocks during travel of the vehicle.

An important object of the invention is to produce a hydraulic shock absorber of the rotary piston type in which the piston shaft projects at each end from the shock absorber body.

A further object is to provide in the type of shock absorbers referred to separate valve assemblies, one of the assemblies to meter and control the hydraulic fluid flow in the shock absorber for damping and absorbing shocks when the vehicle springs are flexed by movement of the vehicle body and axle toward each other, and the other assembly to meter and control the hydraulic fluid flow for damping and absorbing the recoil of the vehicle springs when the vehicle chassis and axles move away from each other.

Another object is to provide separate valve assemblies located in the axial bore of the piston structure and separately manually adjustable from the exterior of the shock absorber.

Still a further object is to utilize the type of shock absorber referred to in individual wheel suspension and included in a suspension linkage quadrilateral with the shock absorber shaft connected at its ends with one of the links of the linkage and serving as a pivot support for such link.

Still a further object is to provide simplified and economically manufactured and assembled structure for shock absorbers of this type, and a structure which will accommodate automatic regulation of the valve assemblies as by means of thermostat elements.

The various features of the invention are incorporated in the structures disclosed on the drawing, in which drawing Figure 1 is a sectional elevation on plane I—I of Figure 2;

Figure 2 is a cross-section on line II—II of Figure 1 and Figure 3;

Figure 3 is a section on plane III—III of Figure 2;

Figure 4 is a diagrammatic elevation showing the inclusion of the shock absorber structure in a linkage quadrilateral for independent support of a vehicle wheel;

Figure 5 is an enlarged plan view of the shock absorber shown in Figure 4.

Referring to Figures 1 to 3, the shock absorber has the cylindrical tubular body 1 which is counter-bored at its ends at 2 and 3 to have a somewhat greater diameter in order to provide at 4 and 5 shoulders against which the end walls or caps 6 and 7 may be applied in a manner to be explained more in detail later.

The space in the interior of the tubular body 1 is divided into two parts by fixed partition walls 12 and 13. These fixed partition walls have the outer cylindrical surfaces 14 which accurately engage and fit the inner side of the body wall 1, and at their inner ends the partition walls are closely engaged by the hub 15 of the piston structure from which hub shaft ends 16 and 17 extend through the end walls 6 and 7, these shaft ends being journaled in the end walls and the extensions 18 thereon.

The partition walls 12 and 13 have the grooves 19 and 20 respectively which serve various purposes. They receive the bolts 21 and 22 which pass through suitable holes in the end walls 6 and 7 and secure these end walls securely against the shoulders 4 and 5 and the sides of the partition walls.

Channels 25 and 26 are provided in the partition wall 13 and channels 27 and 28 in the partition wall 12 in order to establish communication between the grooves 19 and 20 and the working chambers of the shock absorber. The channels 27 and 28 are provided with flap valves 29 and 29' anchored on the lower partition wall 12 as indicated by O and O', Figure 1 and arranged in such a manner that they open up when a partial vacuum is produced in the working chambers A and B and the valves close when pressure prevails in these chambers. Capillary passages 25 and 26 are provided in the upper partition wall 13 for the escape of air which might be trapped or mixed with the fluid in the upper working chambers K and L.

The grooves 19 and 20 terminate in front of other passages 31, 32, 33 and 34 provided in the end walls 6 and 7 in such manner that the grooves 19 and 20 communicate with the replenishing chambers C and D formed by the covers 10 and 11 secured to the ends of the body wall 1 and surrounding the shaft ends 16 and 17. Through the passages 31 and 34 fluid may flow from the reservoirs to the groove 19 and from there through the passages 27 and 28 into the lower working chambers A and B for fluid replenishment. The upper passages 32 and 33 intersect radial channels 35 and 36 in the end walls 6 and 7 respectively which radial channels communicate with the internal bores 37 and 38 in the walls 6 and 7 through peripheral grooves 39 and 40 respectively, any leakage along the shaft ends being thus returned to the fluid reservoirs C and D.

The covers 10 and 11 by holding packing 39' and 40' tightly against the shaft ends and the ends of the wall extensions 18 prevent escape of fluid along the shaft ends to the exterior of the shock absorber.

To the opposite ends of the piston shaft are secured levers 41 and 42 which at their outer ends are usually secured to the axle structure while the shock absorber body 1 is secured usually to the vehicle chassis.

The piston structure hub 15 has two blades or wings 43 and 44 diametrically opposite each other with their ends bearing against the inner face of the cylindrical body wall 1. The shaft ends 16 and 17 have the axial bores 45 and 46 respectively extending therethrough from the outer end thereof but terminating short of communication with each other. In these bores are located the valve assemblies for controlling and metering the fluid flow during operation of the shock absorber. Any suitable type of valve assembly may be utilized, adjustable manually, or automatically by thermostatic means. As shown, the bore 45 receives a member 47 extending between a head 47' and a valve 49, and this member 47 may be a continuous rigid stem or a thermostatic device, the head 47' being threaded in the outer end of the bore 45 whereby the valve structure may be longitudinally adjusted for setting of the valve 49 relative to the seat X between the inner end E of the bore 45 and the reduced inner end F. A similar adjusting member 48 is provided in the bore 46 connecting with the valve 50 for cooperating with the seat Y between the inner end G of the bore and the reduced end H.

A passage 51 is drilled diametrally through the piston hub 15 to intersect the reduced end or chamber F and connect the working chambers K and B with this valve chamber F. Another passage 52 is drilled diametrally through the piston hub to intersect the reduced bore or valve chamber H for connecting this chamber with the working chambers A and L. Extending through the piston hub and the piston vanes 43 and 44 are the passages 53 and 54, both opening into the valve chamber E, and other passages 55 and 56 in the hub and vanes open into the valve chamber G. The passage 53 communicates at its outer end through a port with the working chamber A where it is normally closed by a valve 57 which opens only when there is negative pressure in the chamber A. The passage 55 communicates with the working chamber K through a port which is normally closed by a valve 58 which opens only when there is negative pressure prevailing in the chamber K. The passage 54 communicates with the chamber L through a port which is normally closed by a valve 59 which opens only when negative pressure prevails in the chamber L and the passage 56 communicates with the working chamber B through a port normally closed by the valve 60 which opens only when negative pressure prevails in the chamber B. By virtue of the passage 51 connecting the working chambers K and B, these chambers are simultaneously under either pressure or vacuum, and similarly the chambers A and L connected by the passage 52 are simultaneously under either pressure or vacuum.

Describing now the operation, suppose that the working chambers K and B are the low pressure chambers from which the fluid is forced during bump strokes of the shock absorber as when the vehicle chassis and axle approach each other and that the chambers A and L are the high pressure chambers from which the fluid is forced during rebound strokes of the shock absorber as when the springs recoil or rebound. During a bump stroke the piston structure rotates in clockwise direction (Figures 2 and 3). During such rotation of the piston the valves 58 and 60 will be closed by the pressure so that the only outlet for the fluid from the chambers K and B will be through the passages 51 to the valve chamber E at one side of the valve 49, then past the passage defined by the valve to the valve chamber E, then through passages 53 and 54 and past the valves 57 and 59 to the high pressure chambers A and L, the valve 49 then determining the resistance to the fluid flow during such bump strokes of the piston structure.

During recoil strokes of the piston structure, it will rotate in counter-clockwise direction, the valves 57 and 59 being then held closed by the pressure, and the only outlet of the fluid being then through the passages 52 to the chamber H, then past the valve 50 to the valve chamber G, and from there through the passages 55 and 56 and past the valves 58 and 60 to the low pressure chambers K and B. The valve 50 thus controls resistance to flow during rebound strokes of the piston structure. The valve assemblies may be separately and independently set and adjusted manually for the desired control of the fluid flow and, if thermostat elements are applied to the valves, the valves will be independently thermostatically adjusted to compensate for variations in the temperature and viscosity of the fluid.

The two replenishing chambers or reservoirs C and D are connected together at the bottom through the passages 31 and 34 and the groove 19, and these replenishing chambers may be provided with filler openings closable by plugs 61 and 62. Any leakage of fluid from the working chambers is compensated for by replenishing fluid flowing into the chambers A and B through the passages 27 and 28 in a manner well known in the art.

Figures 4 and 5 show the shock absorber structure included in a linkage quadrilateral for individual suspension of a vehicle wheel. The shock absorber is mounted and secured on the vehicle chassis 67 as by brackets 68 and the arms 41 and 42 extending from the shaft ends 16 and 17 converge and are pivoted at their outer ends, as indicated at 62, to the upper end of the element 64 which supports the axle 69 for a vehicle wheel W. At its lower end the member 64 has pivoted thereto at 65 the outer end of the vehicle spring 66. The member 64 forms the outer link of the suspension linkage quadrilateral, the spring 66 forming the lower resilient link, and the arms 41 and 42 constitute the upper link, the shock absorber shaft forming the pivot connection between this upper link and the vehicle chassis.

The arms 41 and 42 are held to the shaft ends 16 and 17 by nuts 70 which are hollow to accommodate adjusting members 71 connecting with the adjusting heads 47' and 48' of the valve assembly, these adjusting members 71 being turnable as by means of a screw driver for manual setting of the valves from the exterior of the shock absorber. Independent manual setting of the valve structures may thus be readily and easily accomplished.

I have shown a practical and efficient embodiment of the various features of my invention, but I do not desire to be limited to the exact construction, arrangement and operation shown and described as changes and modifications are possible which would still come within the scope of the invention.

I claim as my invention:

1. A hydraulic shock absorber comprising a cylindrical annular wall, end walls cooperating with said annular wall to define a cylindrical space for hydraulic fluid, partitions extending between said walls into said space, said partitions having longitudinal grooves, bolts extending through the end walls and said grooves for locking said end walls and annular wall together, a piston structure operable in said space and having shaft ends extending through said end walls to the exterior thereof, passageways through said piston structure for the flow of hydraulic fluid, valve structures in said passageways for controlling the flow therethrough, fluid reservoirs formed adjacent said end walls and having upper and lower passages therethrough communicating with the grooves in said partitions, replenishing passages through the lower partition for the flow of replenishing fluid from said reservoirs to said space.

2. A hydraulic shock absorber comprising a cylindrical annular wall, end walls cooperating with said annular wall to define a cylindrical space for hydraulic fluid, partitions extending between said walls into said space, said partitions having longitudinal grooves, bolts extending through said grooves for locking said end walls and annular walls together, a piston structure operable in said space between said partitions to displace the fluid, valve means for controlling the flow of the displaced fluid, a fluid reservoir communicating with said grooves, and a fluid replenishing connection between one of said grooves and said space.

3. A hydraulic shock absorber comprising a cylindrical annular wall, end walls cooperating with said annular wall to define a cylindrical space for hydraulic fluid, partitions extending between said walls into said space, said partitions having longitudinal grooves therethrough, bolts extending through said grooves for holding said end walls in place, a piston structure operable in said space between said partitions to displace hydraulic fluid, valve means for controlling the flow of the displaced fluid, fluid reservoirs formed adjacent said end walls and inter-connected through said grooves, and a replenishing connection from one of said grooves to said space.

4. A hydraulic shock absorber comprising a cylindrical annular wall, end walls cooperating with said annular wall to define a cylindrical space for hydraulic fluid, upper and lower partitions extending between said walls into said space, said partitions having longitudinal grooves therethrough, bolts extending through said grooves for holding said end walls in place, a fluid reservoir adjacent one of said end walls communicating with said grooves, check valve controlled passages through the lower partition for connecting the corresponding groove with said space for the flow of replenishing fluid, and air vent passages through the upper partition connecting the corresponding groove with said space.

5. A hydraulic shock absorber comprising a cylindrical annular wall, end walls cooperating with said annular wall to define a cylindrical space for hydraulic fluid, partitions extending between said walls into said space, said partitions having longitudinally extending passageways therethrough, bolts extending through said passageways for securing said end walls in place, a piston structure operable in said space between said partitions to displace the fluid, valve means for controlling the flow of the displaced fluid, a fluid reservoir adjacent each end wall and communicating with the respective ends of the passageways to be thereby inter-connected, and connection between one of said passageways and said space for the flow of replenishing fluid.

MAURICE HOUDAILLE.